(12) United States Patent
Choi et al.

(10) Patent No.: US 11,667,114 B2
(45) Date of Patent: Jun. 6, 2023

(54) APPARATUS FOR MANUFACTURING DISPLAY DEVICE AND METHOD FOR MANUFACTURING DISPLAY DEVICE

(71) Applicant: Samsung Display Co., Ltd., Yongin-si (KR)

(72) Inventors: Myung Gil Choi, Yongin-si (KR); Jung Min Lee, Suwon-si (KR); Min Ha Yun, Seoul (KR); Sang Moo Lee, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 5 days.

(21) Appl. No.: 17/316,095

(22) Filed: May 10, 2021

(65) Prior Publication Data

US 2021/0354437 A1 Nov. 18, 2021

(30) Foreign Application Priority Data

May 13, 2020 (KR) .......................... 10-2020-0056995

(51) Int. Cl.
*B32B 41/00* (2006.01)
*B32B 3/04* (2006.01)
*G01S 17/08* (2006.01)
*B32B 37/10* (2006.01)

(52) U.S. Cl.
CPC .............. *B32B 41/00* (2013.01); *B32B 3/04* (2013.01); *B32B 37/10* (2013.01); *G01S 17/08* (2013.01); *B32B 2457/20* (2013.01)

(58) Field of Classification Search
CPC ....... B32B 2457/20; B32B 37/10; B32B 3/04; B32B 41/00; G01S 17/08
See application file for complete search history.

(56) References Cited

U.S. PATENT DOCUMENTS

| 10,165,715 | B2 | 12/2018 | Choi et al. | |
| 2017/0257988 | A1* | 9/2017 | Choi | ....................... B29C 53/04 |
| 2018/0022013 | A1* | 1/2018 | Choi | ....................... B32B 37/12 |
| | | | | 156/196 |
| 2020/0168581 | A1* | 5/2020 | Jang | ....................... H05K 3/323 |

FOREIGN PATENT DOCUMENTS

| KR | 19990000536 | 1/1999 |
| KR | 10-2017-0104102 | 9/2017 |

* cited by examiner

*Primary Examiner* — Vishal I Patel
(74) *Attorney, Agent, or Firm* — H.C. Park & Associates, PLC

(57) ABSTRACT

An apparatus configured to manufacture a display device and a method of manufacturing a display device include a stage configured to place a process target object on an upper surface thereof; a bending head in contact with the process target object to bend the process target object; a distance measurement sensor installed above the stage to be movable in a horizontal direction; and a cylinder configured to adjust a vertical position of the bending head.

13 Claims, 12 Drawing Sheets

APPARATUS FOR MANUFACTURING DISPLAY DEVICE AND METHOD FOR MANUFACTURING DISPLAY DEVICE

CROSS-REFERENCE TO RELATED APPLICATION

This application claims priority from Korean Patent Application No. 10-2020-0056995 filed on May 13, 2020 in the Korean Intellectual Property Office, and all the benefits accruing therefrom under 35 U.S.C. 119, the contents of which in its entirety are herein incorporated by reference.

BACKGROUND

Field

The inventive concepts relate to an apparatus configured to manufacture a display device and a method of manufacturing a display device.

Discussion of the Background

The importance of display devices has steadily increased with the development of multimedia technology. Accordingly, various types of display devices such as an organic light emitting display (OLED), a liquid crystal display (LCD) and the like have been used.

Recently, mobility-based electronic devices are widely used. Mobile electronic devices may include compact electronic devices such as mobile phones as well as table personal computers (PCs).

Such mobile electronic devices are equipped with a display device for providing a user with visual information such as an image and a video to support various functions. Recently, with the miniaturization of the other parts for driving a display device, the display device is becoming one of the largest parts constituting an electronic device and developed to be bent at a certain angle from a flat state.

The above information disclosed in this Background section is only for understanding of the background of the inventive concepts, and, therefore, it may contain information that does not constitute prior art.

SUMMARY

It is to be understood that both the foregoing general description and the following detailed description are exemplary and explanatory and are intended to provide further explanation of the invention as claimed.

Aspects of the inventive concepts provide an apparatus to manufacture a display device, which is capable of bending a process target object stably and accurately.

Aspects of the inventive concepts also provide a method of manufacturing a display device, which is capable of bending a process target object stably and accurately.

Additional features of the inventive concepts will be set forth in the description which follows, and in part will be apparent from the description, or may be learned by practice of the inventive concepts.

An embodiment of an apparatus to manufacture a display device, includes a stage configured to place a process target object on an upper surface thereof; a bending head in contact with the process target object to bend the process target object; a distance measurement sensor installed above the stage to be movable in a horizontal direction; and a cylinder configured to adjust a vertical position of the bending head.

An embodiment of a method to manufacture a display device, includes tuning positions of a stage and a bending head; placing a target object on the stage; and bending the target object while the bending head is in contact with the target object, wherein the tuning includes measuring, using a distance measurement sensor, a first distance between the distance measurement sensor and an upper surface of the bending head, and a second distance between the distance measurement sensor and an upper surface of the stage for each zone, calculating a slope of the bending head based on the first distance, and calculating a slope of the stage based on the second distance; adjusting the slope of the bending head when the slope of the bending head is out of a tolerance range, and adjusting the slope of the stage when the slope of the stage is out of a tolerance range; measuring a third distance that is a height difference between the upper surface of the bending head and the upper surface of the stage using the distance measurement sensor; and adjusting a position of the bending head when the third distance is out of a tolerance range.

The display device manufacturing apparatus according to an embodiment is capable of improving reliability and display quality of a display device manufactured from a process target object by bending the process target object stably and accurately.

The display device manufacturing method according to an embodiment is capable of improving reliability and display quality of a display device manufactured from a process target object by bending the process target object stably and accurately.

The effects of the inventive concepts are not limited to the aforementioned effects, and various other effects are included in the present specification.

BRIEF DESCRIPTION OF THE DRAWINGS

The above and other aspects and features of the inventive concepts will become is more apparent by describing in detail exemplary embodiments thereof with reference to the attached drawings, in which.

DETAILED DESCRIPTION OF THE EMBODIMENTS

Figure 1:
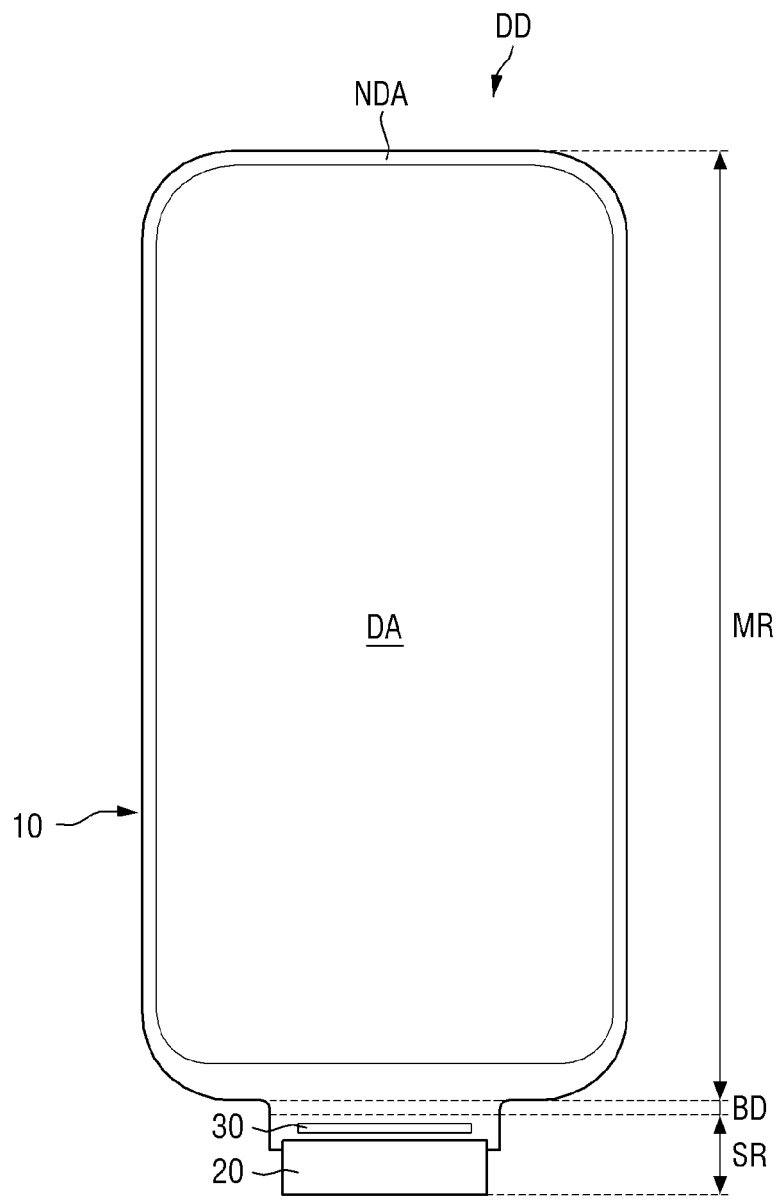
FIG. 1 is a plan view illustrating a display device according to an exemplary embodiment.

The accompanying drawings, which are included to provide a further understanding of the invention and are incorporated in and constitute a part of this specification, illustrate exemplary embodiments of the invention, and together with the description serve to explain the inventive concepts.

Detailed Description

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are illustrated in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

The D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present invention will now be described more fully hereinafter with reference to the accompanying drawings, in which preferred embodiments of the invention are illustrated. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present. To this end, the term "connected" may refer to physical, electrical, and/or fluid connection, with or without intervening elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

Hereinafter, exemplary embodiments will be described with reference to the accompanying drawings.

Figure 2:
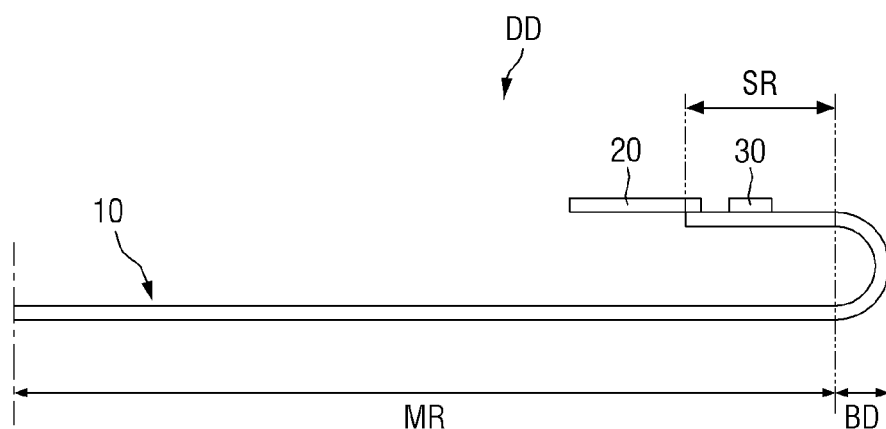
FIG. 2 is a schematic partial cross-sectional view illustrating a display device according to an exemplary embodiment.

FIG. 1 is a plan view illustrating a display device according to an exemplary embodiment. FIG. 2 is a schematic partial cross-sectional view illustrating a display device according to an exemplary embodiment.

Referring to FIGS. 1 and 2, a display device DD is a device configured to display a moving image or a still image. The display device DD may be used as a display screen of various products such as televisions, laptop computers, monitors, billboards and the Internet of Things as well as portable electronic devices such as mobile phones, smart phones, tablet personal computers (tablet PCs), smart watches, watch phones, mobile communication terminals, electronic notebooks, electronic books, portable multimedia players (PMPs), navigation systems and ultra mobile PCs (UMPCs). Examples of the display device DD may include an organic light emitting display device, a liquid crystal display device, a plasma display device, a field emission display device, an electrophoretic display device, an electrowetting display device, a quantum dot light emitting display device, a micro LED display device, and the like. Hereinafter, an organic light emitting display device will be described as an example of the display device, but the inventive concepts are not limited thereto.

The display device DD may include a display panel 10. The display panel 10 may include a flexible substrate including a flexible polymer material such as polyimide. Accordingly, the display panel 10 can be bent, folded or rolled.

The display panel 10 may include a main region MR and a bending region BD connected to one side of the main region MR. The display panel 10 may further include a sub-region SR which is connected to the bending region BD and overlaps the main region MR in a thickness direction.

When a portion of the display panel 10 displaying a screen is defined as a display area DA and a portion of the display panel 10 not displaying a screen is defined as a non-display area NDA, the display area DA of the display panel 10 is disposed in the main region MR. The remaining portion other than the display area DA becomes the non-display area NDA of the display panel 10. In one embodiment, a peripheral edge portion of the display area DA in the main region MR, the entire bending region BD and the entire sub-region SR may be the non-display area NDA. However, the inventive concepts are not limited thereto, and the bending region BD and/or the sub-region SR may also include the display area DA.

The main region MR may have a shape substantially similar to an outer shape of the display device DD in plan view. The main region MR may be a flat region located on one plane. However, the inventive concepts are not limited thereto, and at least one edge of the remaining edges except an edge (side) of the main region MR connected to the bending region BD may be bent in a curved shape or bent in a vertical direction.

The display area DA of the display panel 10 may be disposed at the center of the main region MR. The display area DA may include a plurality of pixels. The display area DA may have a rectangular shape or a rectangular shape with rounded corners. However, the inventive concepts are not limited thereto, and the display area DA may have various shapes such as a square, other polygons, a circle, an ellipse or the like.

If at least one of the edges other than the edge of the main region MR connected to the bending region BD is curved or bent, the display area DA may also be disposed on the corresponding edge. However, the inventive concepts are not limited thereto, and the non-display area NDA that does not display a screen may be disposed on the curved or bent edge. Alternatively, both the display area DA and the non-display area NDA may be disposed thereon.

The non-display area NDA may be located around the display area DA in the main region MR. The non-display area NDA of the main region MR may be placed in an area from the outer boundary of the display area DA to the edge of the display panel 10. Signal lines or driving circuits may be disposed in the non-display area NDA of the main region MR to apply a signal to the display area DA.

In the bending region BD, the display panel 10 may be bent with a curvature downward in a thickness direction, i.e., a direction opposite to a display surface. The bending region BD may have a constant radius of curvature. However, without being limited thereto, the bending region BD may have a different radius of curvature for each section. The surface of the display panel 10 is reversed as the display panel 10 is bent in the bending region BD. In other words, one surface of the display panel 10 facing upward may be changed to face outward through the bending region BD and then to face downward.

The sub-region SR extends from the bending region BD. The sub-region SR may extend in a direction parallel to the main region MR from a point where bending is completed. The sub-region SR may overlap the main region MR in the thickness direction of the display panel 10. The sub-region SR may overlap the non-display area NDA of the edge of the main region MR and further overlap the display area DA of the main region MR.

The width of the sub-region SR may be the same as the width of the bending region BD, but is not limited thereto.

A driving chip 30 may be disposed on the sub-region SR of the display panel 10. The driving chip 30 may include an integrated circuit configured to drive the display panel 10. In one embodiment, the integrated circuit may be, but is not limited to, a data driving integrated circuit that generates and provides a data signal. The driving chip 30 may be mounted on the display panel 10 in the sub-region SR. The driving chip 30, which is mounted on one surface of the display panel 10 which is the same surface as the display surface, may be mounted on the surface of the display panel 10 facing downward in the thickness direction as the bending region BD is bent and reversed as described above such that the upper surface of the driving chip 30 faces downward.

The driving chip 30 may be attached onto the display panel 10 through an anisotropic conductive film or through ultrasonic bonding. The width of the driving chip 30 in a horizontal direction may be smaller than that of the display panel 10 in a horizontal direction. The driving chip 30 may be disposed in a central portion of the sub-region SR in a horizontal direction. The left edge and the right edge of the driving chip 30 may be separated from the left edge and the right edge of the sub-region SR, respectively.

A pad portion (not illustrated) may be provided at the end of the sub-region SR of the display panel 10, and a printed circuit board 20 may be connected to the pad portion (not illustrated). The printed circuit board 20 may be a flexible printed circuit board or film.

Figure 3:
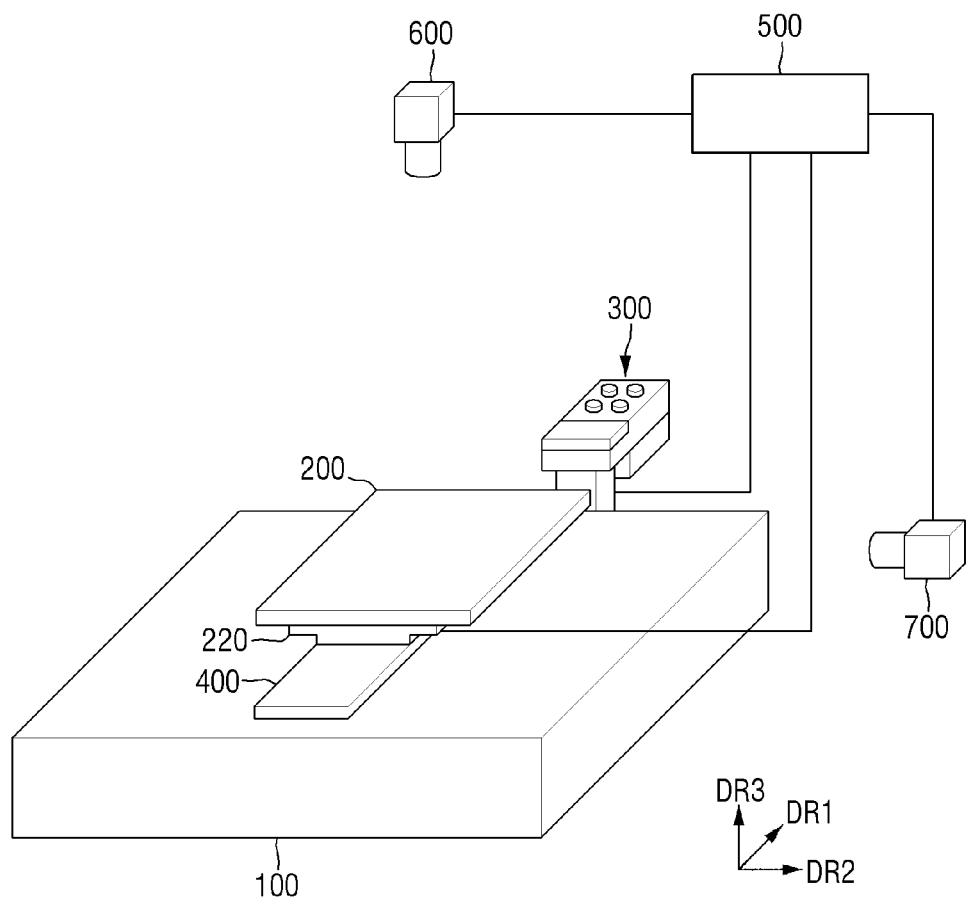
FIG. 3 is a perspective view illustrating a display device-manufacturing apparatus according to an exemplary embodiment.
Figure 4:
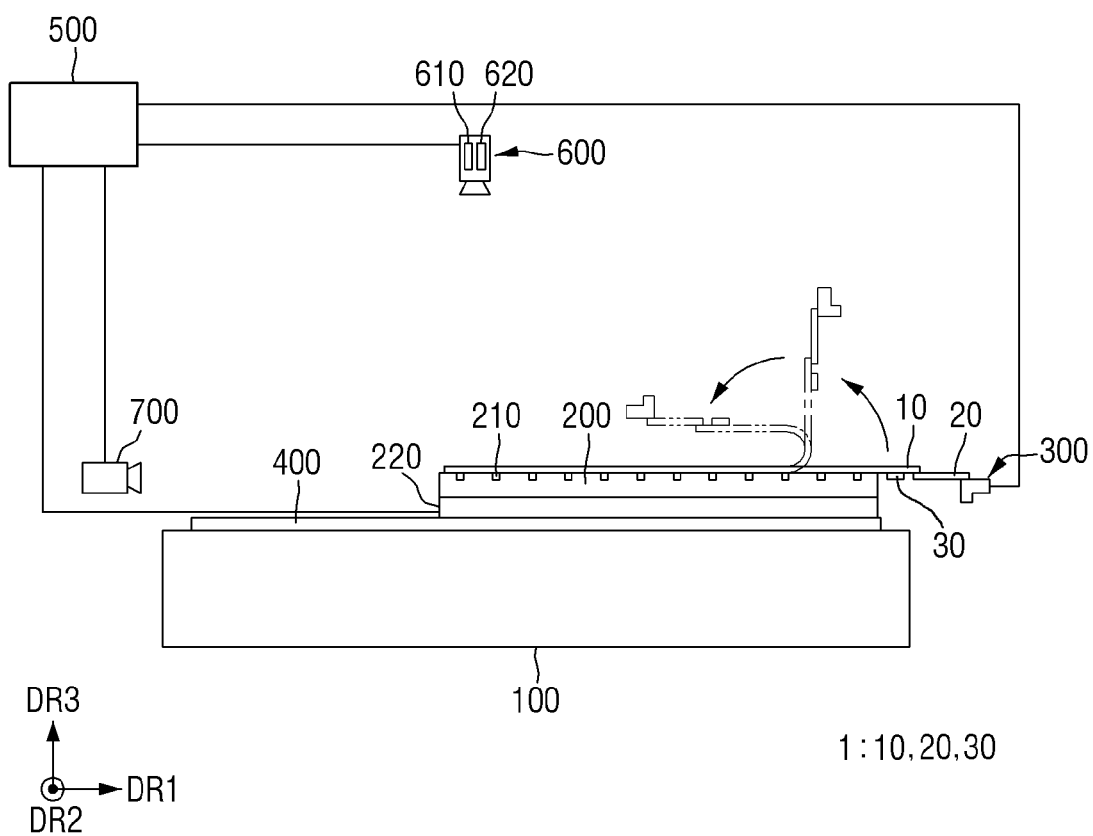
FIG. 4 is a schematic view illustrating a bending process using a display device-manufacturing apparatus according to an exemplary embodiment.
Figure 5:
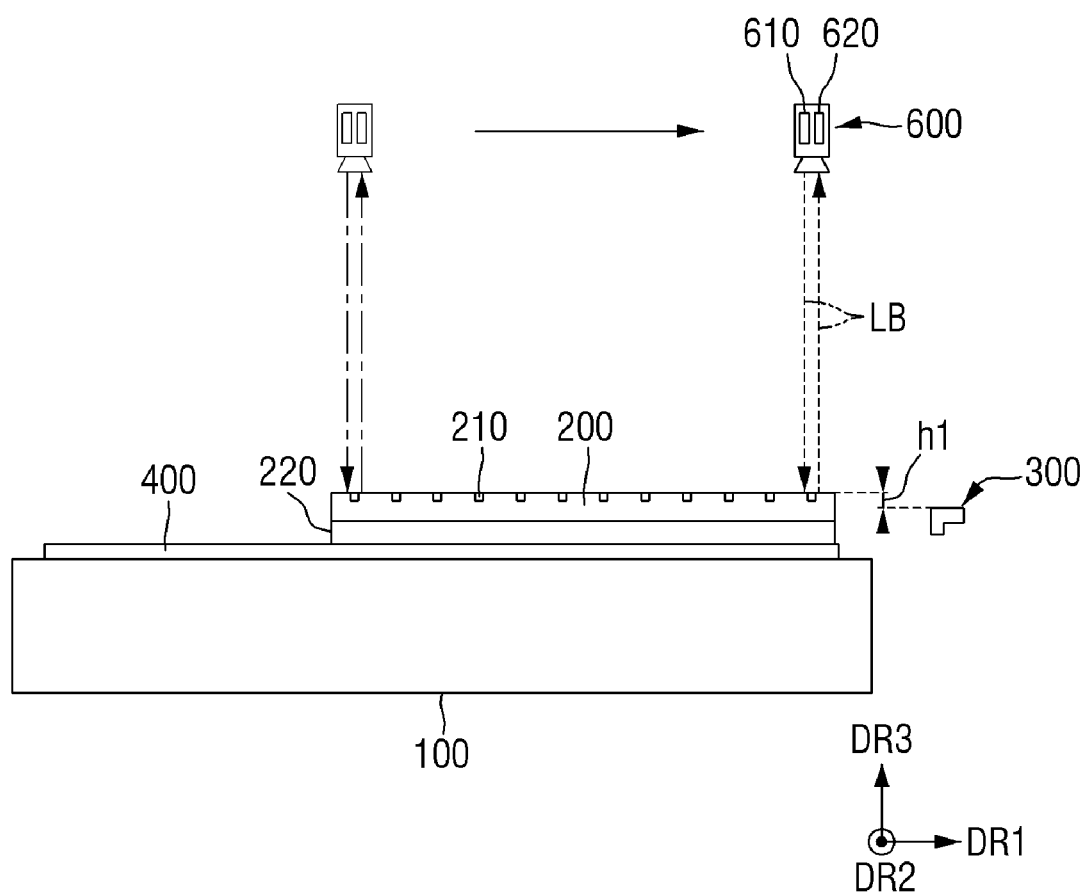
FIG. 5 is a schematic view illustrating an operation of an upper sensor according to an exemplary embodiment.
Figure 6:
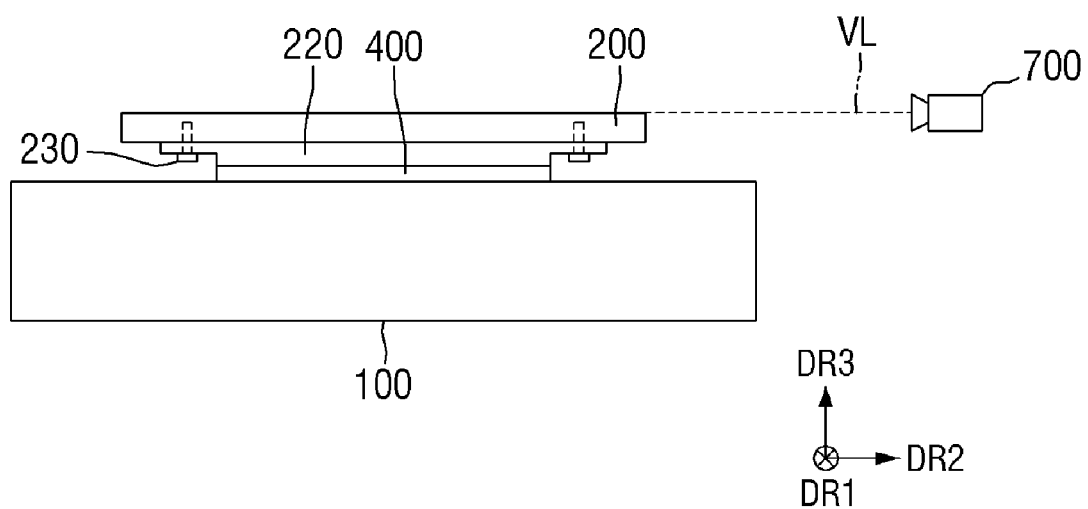
FIG. 6 is a schematic view illustrating an operation of a side sensor according to an exemplary embodiment.
Figure 7:
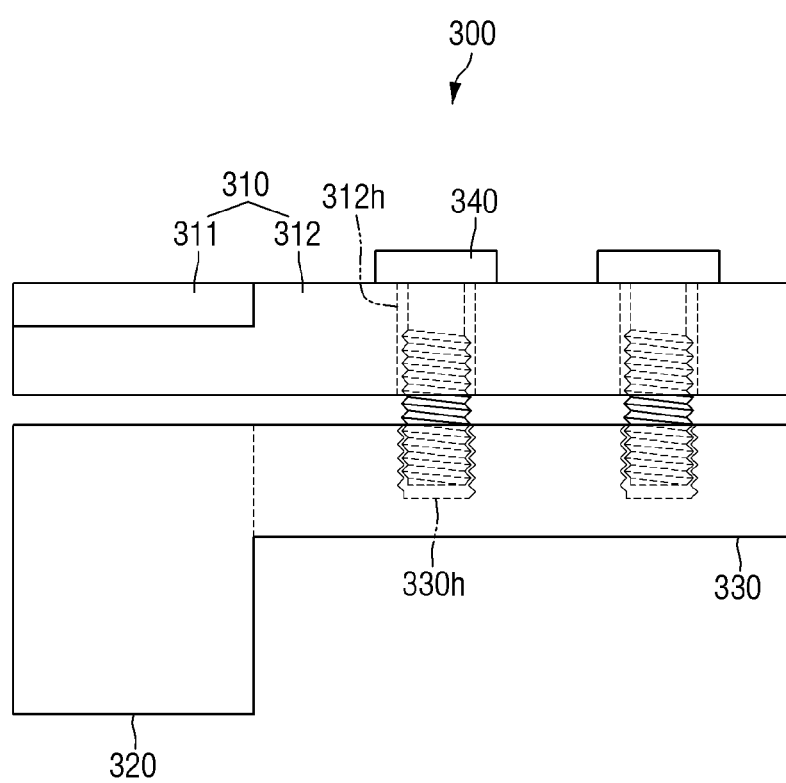
FIG. 7 is a schematic view illustrating a bending unit according to an exemplary embodiment.

FIG. 3 is a perspective view illustrating a display device-manufacturing apparatus according to an exemplary embodiment. FIG. 4 is a schematic view illustrating a bending process using a display device-manufacturing apparatus according to an exemplary embodiment. FIG. 5 is a schematic view illustrating an operation of an upper sensor according to an exemplary embodiment. FIG. 6 is a schematic view illustrating an operation of a side sensor according to an exemplary embodiment. FIG. 7 is a schematic view illustrating a bending unit according to an exemplary embodiment.

In reference to FIGS. 3 to 7, the display device manufacturing apparatus according to an exemplary embodiment may include a support fixture 100, a stage 200, a bending unit 300, a guide member 400, a controller 500, an upper sensor 600, and a side sensor 700.

A process target object 1 may be placed on the stage 200. The process target object 1 may include the display panel 10, printed circuit board 20, and driving chip 30. The stage 200 may provide a space to place the processing target object 1. In detail, a display panel 10 may be placed on the stage 200. The stage 200 may have, but is not limited to, a rectangular parallelopiped shape with a flat upper surface, a cylindrical shape, or other polyprism shapes.

The stage 200 may include a suction member 210 configured to fix the display panel 10 placed on the upper surface thereof. The display panel 10 placed on the stage 200 may be fixed on the upper surface of the stage 200 by means of the suction member 210. For example, the suction member 210 may be connected to a vacuum module (not illustrated) arranged outside the stage 200 and include suction holes configured to produce a negative pressure. However, the inventive concepts are not limited thereto, and the suction member 210 may include an adhesion chuck or an electrostatic chuck. Although will be described later, a process configured to bend the process target object 1 with the bending unit 300 may be carried out in the state where the display panel 10 is fixed on the stage 200. The stage 200 may be replaced depending on the kind of the display panel 10. For example, the stage 200 may be replaced depending on the size, shape, and material of the display panel 10.

On the bottom part of the stage 200, a stage drive member 220 may be arranged to move the stage 200. The stage drive member 200 may have a mechanical structure enabling the stage 200 to rotate. The stage drive member 220 may also include a cylinder enabling the stage 200 to move in the vertical direction. The stage drive member 220 may horizontally move in the first direction DR1 or the second direction DR2 or rotate on one of an axis extending in the first direction DR1, an axis extending in the second direction DR2, or an axis extending the third direction DR3 due to the alignment or the nature of process. That is, the stage drive member 220 may be provided with a transfer means configured to move the stage 200.

The stage 200 and the stage drive member 220 may be clamped together by a plurality of stage clamping members 230. In an exemplary embodiment, the stage drive member 220 may have clamping holes (not illustrated) each having a screw thread on the inner circumference thereof, and the stage 200 may have clamping pits (not illustrated) each having a screw thread on the inner circumference thereof. The stage clamping members 230 may be, but are not limited to, bolts each having a screw thread on the outer circumference thereof to be engaged with the clamping holes of the stage drive member 220 and the clamping pits of the stage 200. The stage clamping members 230 may clamp the stage 200 and the stage drive member 220 to substantially the same fastening degree (or with substantially the same fastening force) such that the stage 200 and the stage drive member 220 substantially remain in parallel. As described above, the stage 200 may be replaced depending on the kind of the display panel 10 to which the bending process is applied, and the plurality of stage clamping members 230 may be removed and reinstalled whenever the stage 200 is replaced. In this case, if the stage clamping members 230 are reinstalled to different fastening degrees (or with different fastening forces), the parallelism of the stage drive member and the replaced stage 200 may be lost.

The stage drive member 220 may be connected to the guide member 400 to slide the stage 200. The guide member 400 may be located below the stage drive member 220. In an exemplary embodiment, the guide member 400 may have a shape extended in the first direction DR1. The stage 200 may be connected to the stage drive member 220 so as to slide along the guide member 400 in the first direction DR1. In addition, the stage drive member 220 may include an air floating means to reduce sliding friction of the stage 200. In this case, the stage 200 may move with less force.

The support fixture 100 may be arranged under the guide member 400. The support fixture 100 may support the guide member 400 during the process. The guide member 400 may be mounted on the support fixture 100, the stage drive member 220 may be mounted on the guide member 400, and the stage 200 may be connected onto the stage drive member 220. The support fixture 100 may provide a space to place the stage 220.

The bending unit 300 may be arranged outside the stage 200, e.g., at one side in the first direction DR1. Although it is depicted in FIGS. 3 to 6 that the bending unit 300 is separated from the support fixture 100 as to be described later, the inventive concepts are not limited thereto, and the banding unit 300 may be mounted on the support fixture 100.

The bending unit 300 may contact one surface of a printed circuit board 20 at one side of the printed circuit board 20. That is, the printed circuit board 20 may contact the bending unit 300 at one side and may be connected to the display panel 10 at the other side. The bending unit 300 is configured to bend the display panel 10. In other words, the bending unit 300 moves the printed circuit board 20 while the bending unit 300 is connected to the printed circuit board 20 in order to bend the display panel 10. The bending unit 300 may have, but is not limited to, a bar shape extending in the first direction DR1.

The bending unit 300 may include a bending head 310, a vertical movement member 320, and a bending drive member 330. The bending unit 300 may be driven by the vertical movement member 320 and the bending drive member 330.

The bending head 310 may directly contact and fix the printed circuit board 20 during the bending process. The bending head 310 may include a suction member 311 that directly contacts the printed circuit board 20 and a connection member 312 connected with the bending drive member 330. The suction member 311 may fix the printed circuit board 20 in a vacuum suction manner or an adhesion manner without being limited thereto.

The vertical movement member 320 may move the bending unit 300 in a direction perpendicular to the upper surface of the bending head 310. The vertical movement member 320 may include a cylinder.

The bending drive member 330 may rotate the bending unit 300 and horizontally move the bending unit 300 to carry out the bending process. Although not illustrated, the bending drive member 330 may rotate on an axis extending in the second direction DR2. The bending drive member 330 may also move in the first and third directions DR1 and DR3. As to be described later, the bending head 310 may be connected to the bending drive member 330 to rotate and move along with the bending drive member 330. Accordingly, the printed circuit board 20 sucked onto the bending head 310 may rotate and move, as the bending drive member rotates and moves, to perform the bending process on the process target object 1.

The connection member 312 and the bending drive member 330 may be connected by a plurality of bending-clamping members 340. In an exemplary embodiment, the connection member 312 may have bending connection holes 312h each having a screw thread on the inner circumference thereof, and the bending drive member 330 may have bending connection pits 330h each having a screw thread on the inner circumference thereof. The bending-clamping members 340 may be, but are not limited to, bolts each having a screw thread on the outer circumference thereof to be engaged with the bending connection holes 312h of the connection member 312 and the bending connection pits 330h of the bending drive member 330. The bending-clamping members 340 may clamp the connection member 312 of the bending head 310 and the bending drive member 330 to substantially the same fastening degree (or with substantially the same fastening force) such that the bending drive member 330 and the connection member 312 substantially remain in parallel. As described above, the bending header 310 may be replaced depending on the kind of the printed circuit board 200 to which the bending process is applied, which includes removal and reinstallation of the plurality of bending-clamping members 340. In this case, if the bending-clamping members 340 are reinstalled to different fastening degrees (or with different fastening forces), the parallelism of the connection member 312 and the replaced bending drive member 330 may be lost.

Although it is depicted that the bending unit 300 is arranged under the bottom part of the printed circuit board 20 in the drawings, the inventive concepts are not limited thereto, and the bending unit 300 may be arranged on the upper part of the printed circuit board 20.

Although not illustrated, the bending unit 300 may further include a bending controller (not illustrated). The operation of the bending unit 300 may be controlled by the bending controller (not illustrated). The bending controller (not illustrated) may include a measurement unit (not illustrated), a memory unit (not illustrated), a signal unit (not illustrated), and an operation unit (not illustrated).

The memory unit (not illustrated) may store a reference course and a movement course of the bending unit 300 that is measured by the measurement unit (not illustrated). The signal unit (not illustrated) may produce a start signal and an end signal to the measurement unit (not illustrated). The measurement unit (not illustrated) may start measurement on the movement course of the bending unit 300 upon receipt of the start signal from the signal unit (not illustrated) and end the measurement upon receipt of the end signal. The operation unit (not illustrated) may compare the movement course of the bending unit 300 that was measured by the measurement unit (not illustrated) with the reference course or compare two or more movement courses of the bending unit 300 that were measured by the measurement unit (not illustrated).

The bending controller (not illustrated) may control the bending drive member 330 to drive the bending unit 300 based on a result of the comparison carried out by the operation unit (not illustrated). That is, it may be possible to correct the movement course of the bending unit 200 based on a result of the comparison carried out by the operation unit (not illustrated).

The display device manufacturing apparatus according to an exemplary embodiment may include the controller 500. The controller 500 may receive signals from the upper sensor 600 and the side sensor 700 to be described later and produce a correction signal to the stage drive member 220 and the vertical movement member 320. That is, the controller 500 may adjust the position of the vertical movement member 430 in relation to the bending header 310 and the position of the stage drive member 220 in relation to the stage 200.

The upper sensor 600 may be located at one side of the stage 200 and the bending unit 300 in the third direction DR3. The upper sensor 600 may be a laser sensor including a light transmission member 610 configured to emit a laser beam LB and a light reception member 620 configured to receive the laser beam LB. The upper sensor 600 may be a distance measurement sensor. The upper sensor 600 may measure the time taken for the laser beam LB transmitted by the light transmission member 610 to arrive at the light reception member 620 after being reflected on a distance measurement target object to determine the distance from the object.

The upper sensor 600 may move in the first and second directions DR1 and DR2. Accordingly, the upper sensor 600 may scan the upper surface of the stage 200 and the bending unit 300 to measure the distance from the upper sensor 600 to the stage 200 and the distance from the upper sensor 600 to the bending unit 300.

Although not illustrated, the upper sensor 600 may further include an upper sensor operation unit (not illustrated) and an upper sensor display unit (not illustrated). It may also be possible to calculate a degree of slope of a surface of the distance measurement target based on the distance value measured by scanning per zone by means of the upper sensor operation unit (not v). The calculated measurement value may be displayed on the upper sensor display unit (not illustrated).

In an exemplary embodiment, the degree of slope of the distance measurement target may be derived from the slope calculated by the upper sensor operation unit (not illustrated) based on a maximum value and a minimum value among the distance values measured in the corresponding zone and a horizontal distance between a point having the maximum value and a point having the minimum value. In another embodiment, the degree of slope of the distance measurement target may be derived from a standard deviation calculated by the upper sensor operation unit (not illustrated) based on the data of the distance values measured in the corresponding zone.

It may be possible to measure a first height difference h1 as the height difference between the upper surface of the stage 200 and the upper surface of the bending unit 300 by using the upper sensor 600. The first height difference h1 may be measured in the state where the upper surface of the stage 20 and the upper surface of the bending unit are aligned in parallel. The first height difference h1 may be derived from a distance from the upper sensor 600 to the upper surface of the stage 200 and a distance from the upper sensor 600 to the upper surface of the bending unit 300. Although the first height difference h1 may be mostly equal to the thickness of the printed circuit board 20 in an exemplary embodiment, the inventive concepts are not limited thereto.

The upper sensor 600 may measure the distance between the upper sensor 600 and the upper surface of the bending head 310 and the distance between the upper sensor 600 and the upper surface of the stage 200 and send a measurement result to the controller 500, which may derive the distance between the upper surface of the bending head 310 and the upper surface of the stage 200 based on the respective distances and determine a position adjustment amount of the vertical movement member 320 in the vertical direction based on the derived distance.

The side sensor 700 may be located at one side of the stage 200 in the second direction DR2. The side sensor 700 may include a camera module (not illustrated).

In an exemplary embodiment, the side sensor 700 may move in the first direction DR1. The side sensor 700 may be adjusted in height or remain, if there is no manipulation, at the corresponding height. The side sensor 700 may sense the stage 200 along a reference line VL. The reference line VL may be a virtual line extending in a direction to which the side sensor 700 is oriented. In an exemplary embodiment, the reference line VL of the side sensor 700 may be level with the upper surface of the stage 200. The side sensor 700 may sense a change of the height of the upper surface of the stage 200 when the stage 200 is replaced. For example, the upper surface of the stage 200 may be set to be level with the reference line VL of the side sensor 700. In the case where the upper surface of the stage 200 is out of level with the reference line VL, the side sensor 700 may generate a signal to the controller 500 in order for the controller 500 to control the stage drive member 220 such that the upper surface of the stage 200 is positioned level with the reference line VL. That is, because the height of the side sensor 700 remains constant even when the stage 200 is replaced, it may be possible to minimize a height variation of the stage 200 by setting the height of the upper surface of the replaced stage 200 to be level with the reference line VL of the side sensor 700.

The display device manufacturing apparatus according to an exemplary embodiment is capable of identifying degrees of slopes of the stage 200 and the bending unit 300. It may also be possible to measure the height of the stage 200 and the height of the bending unit 300 based on the height of the stage 200 for automatic correction. This may make it possible for the process target object 1 to be accurately placed across the stage 200 and the bending unit 300 and stably bent by the bending unit 300, which leads to improvement of the reliability and display quality of the display device DD manufactured from the process target object 1.

Hereinafter, a description is made of a method of manufacturing a display device according to an exemplary embodiment. That is, the operation of the apparatus configured to manufacture a display device is described.

Figure 8:
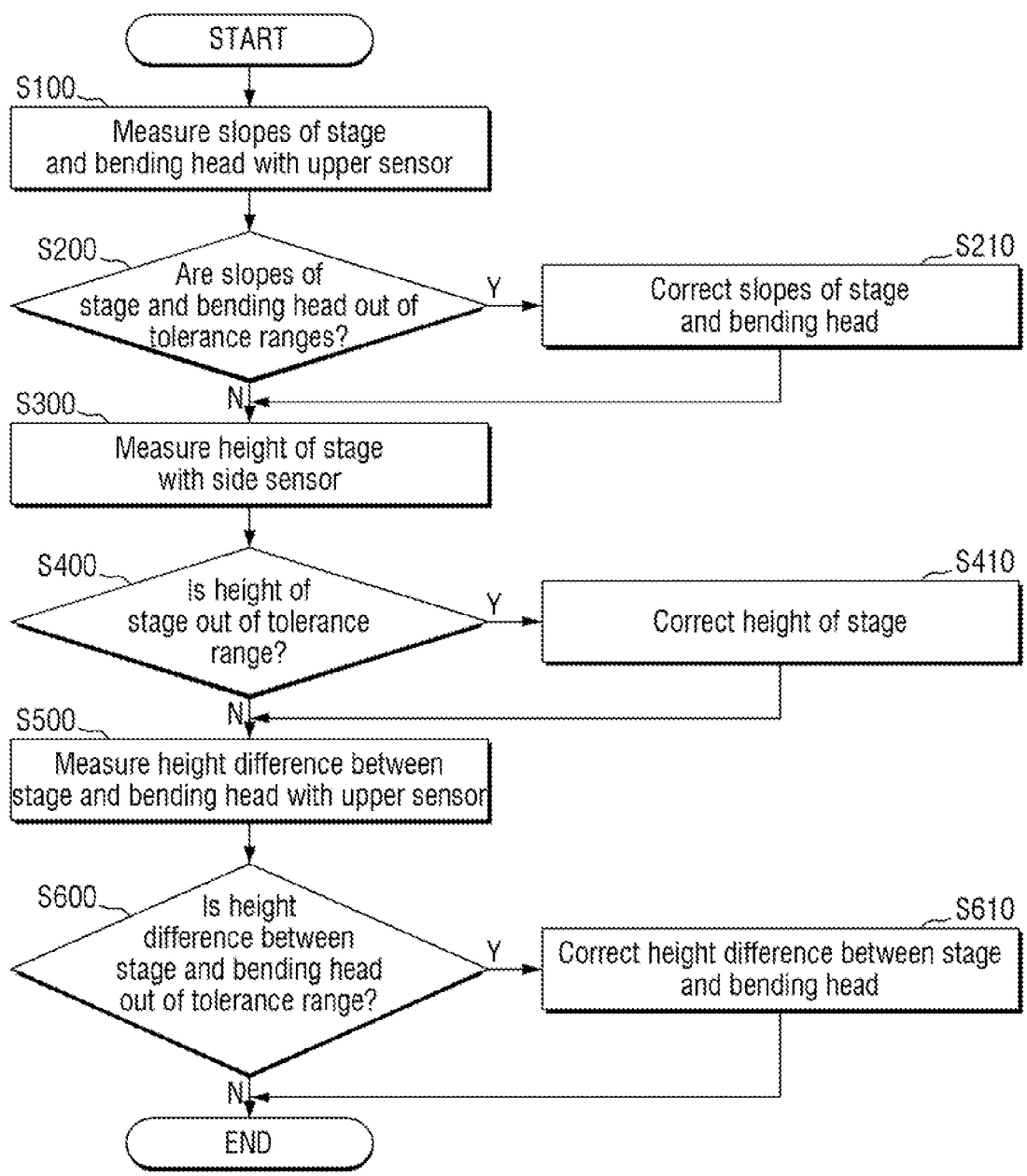
FIG. 8 is a flowchart illustrating a method of inspecting and correcting positions of a stage and a bending unit according to an exemplary embodiment.

FIG. 8 is a flowchart illustrating a method of inspecting and correcting positions of a stage and a bending unit according to an exemplary embodiment. FIGS. 9 to 12 are schematic views illustrating an inspection and correction method of a stage and a bending unit according to an exemplary embodiment.

The display device manufacturing method according to an exemplary embodiment may include inspecting and correcting positions of the stage 200 and the bending head 310, arranging the process target object 1 on the stage 200, and bending the process target object 1 that is in the state of contacting the bending head 310.

Hereinafter, a description is made of the method of inspecting and correcting the positions of the stage 200 and the bending head 310 with reference to FIGS. 8 to 12.

In reference to FIG. 8, the method of inspecting and correcting positions of the stage 200 and the bending head 310 according to an embodiment may include measuring slopes of the stage 200 and the bending head 310 with the upper sensor at operation S100, determining at operation S200 whether the slopes of the stage and the bending head are each out of a predetermined tolerance range, correcting slopes at operation S210, measuring a height of the stage with the side sensor at operation S300, determining at operation S400 whether the height of the stage is out of a tolerance range, correcting the height at operation S410, measuring a height difference between the stage and the bending head with the upper sensor at operation S500, determining at operation S600 whether the height difference between the stage and the bending head is out of a tolerance range, and correcting the height difference at operation S610.

Correcting the slopes of the stage and the bending head at operation S210, correcting the height of the stage at operation S410, and correcting the height difference between the stage and the bending head at operation S610 may be carried out in the cases where the slopes, the height, and the height difference are determined out of the corresponding tolerance ranges respectively at operations S200, S400, and S600.

Figure 9:
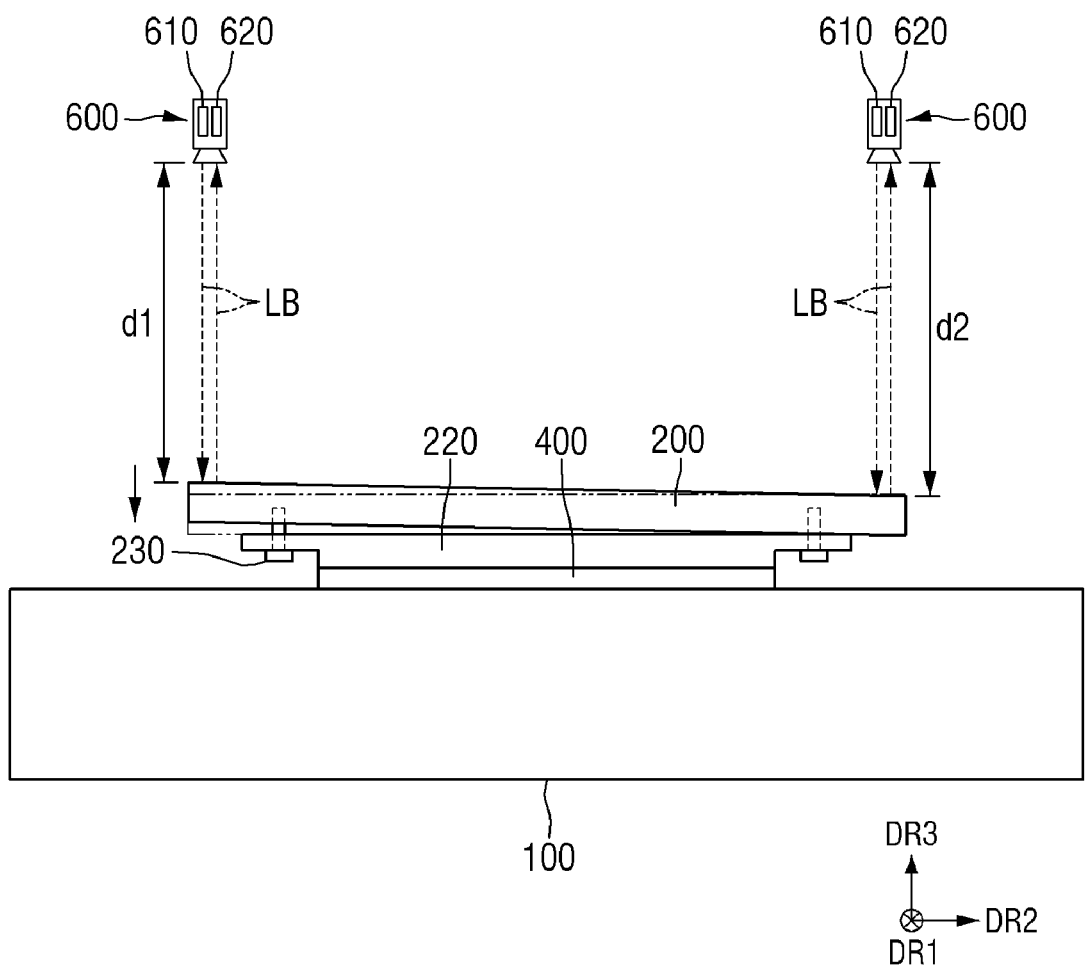
FIGS. 9, 10, 11, and 12 are schematic views illustrating an inspection and correction method of a stage and a bending unit according to an exemplary embodiment.
Figure 10:
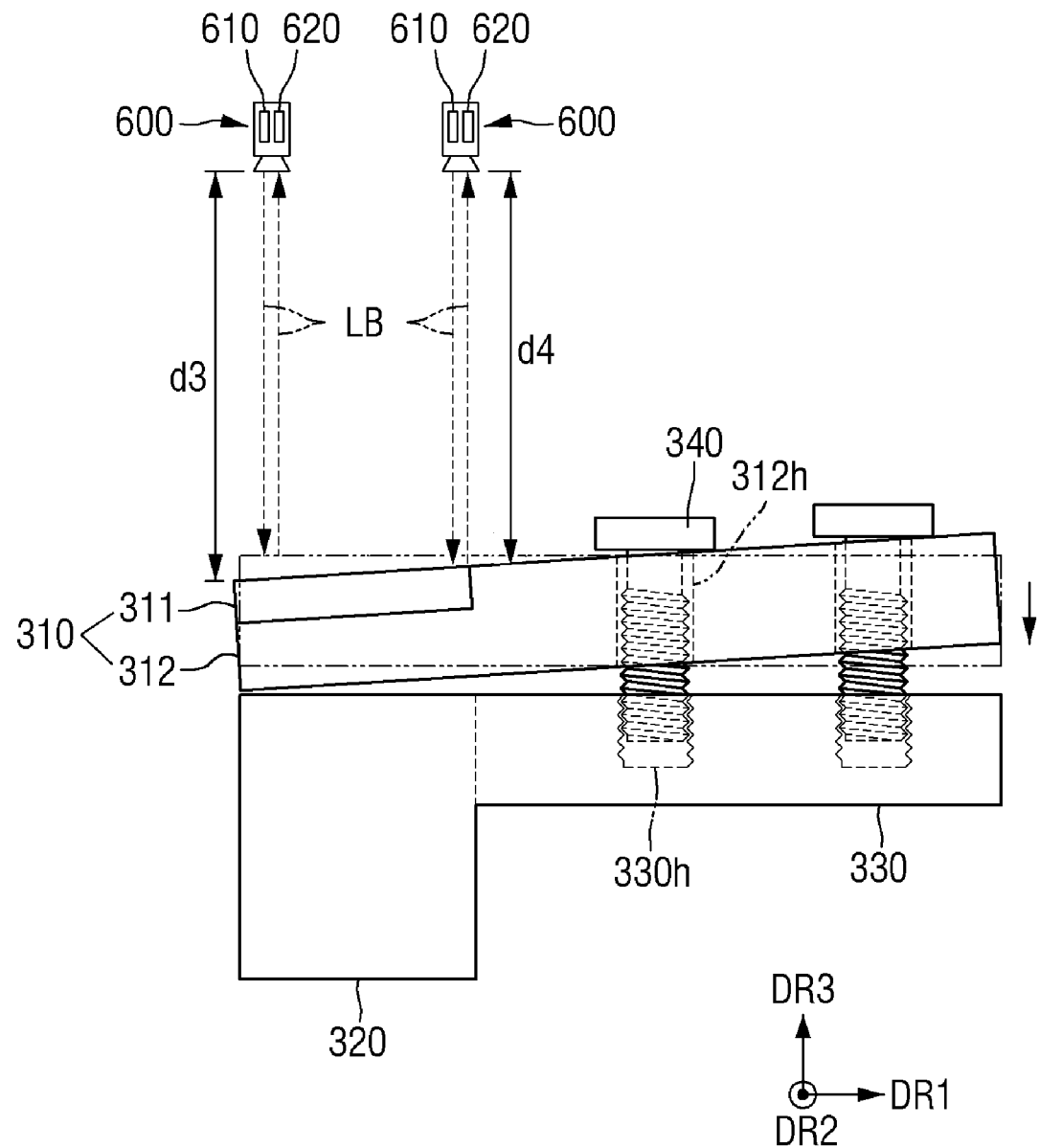

In reference to FIGS. 8, 9, and 10, the method of inspecting and correcting the positions of the stage 200 and the bending head 310 according to an embodiment may be carried out by preferentially measuring the slopes of the stage 200 and the bending head 310. The slope measurement may be carried out first on the stage 200 and then the bending head 310, but not limited thereto, and may be carried out first on the bending head 310.

Measuring the slopes of the stage 200 and the bending head 310 at operation S100 may be carried out on the upper surfaces of the stage 200 and the bending head 310 via laser scanning with the upper sensor 600. As described above, the upper sensor 600 may include the light transmission member 610 configured to emit the laser beam LB and the light reception member 620 configured to receive the laser beam LB. The upper sensor 600 may measure the time taken for the laser beam LB transmitted by the light transmission member 610 to arrive at the light reception member 620 after being reflected on the upper surfaces of the stage 200 and the bending head 310 to determine the distance from the object. The zone being substantially scanned by the laser beam LB on the bending head 310 may be the suction member 311.

The slope of the stage 200 may be derived based on the maximum value and minimum value among the per-zone distance values of the upper surface of the stage 200 that are measured from the upper sensor 600 and the horizontal distance between the points having the maximum and minim values. For example, the stage 200 may be sloped such that one end thereof in the second direction DR2 is down and the other end thereof in the second direction DR2 is up. The distance from the upper sensor 600 to the one end of the stage 200, which is measured in the second direction DR2, may be referred to as first distance d1, and the distance from the upper sensor 600 to the other end may be referred to as second distance d2; the second distance d2 may be greater than the first distance d1. The slope of the stage 200 may be derived based on the first distance d1, the second distance d2, and the distance between the one and the other ends of the stage 200.

The slope of the bending head 310 may be derived based on the maximum and minimum values among the per-zone distance values of the upper surface of the bending head 310 that are measured from the upper sensor 600 and the horizontal distance between the points having the maximum and minimum values. Because the laser beam LB emitted from upper sensor 600 substantially scans the suction member 311 of the bending head 310, the slope of the bending head 310 may be derived based on the maximum and minimum values among the per-zone distance values of the upper surface of the suction member 311 that are measured from the upper sensor 600 and the horizontal distance between the points having the maximum and minimum values. For example, the suction member 311 may be sloped such that one end is up and the other end is down in the first direction DR1. The distance from the upper sensor 600 to the other end of the suction member 311 in the first direction DR1 may be referred to as third distance d3, and the distance from the upper sensor 600 to one end of the suction member 311 in the first direction DR1 may be referred to as fourth distance d4; the fourth distance d4 may be less than the third distance d3. The slope of the bending head 310 may be derived based on the third distance d3, the second distance d3, and the distance between the one and the other ends of the suction member 311.

However, the inventive concepts are not limited thereto, the slope of the bending head 310 may be derived based on a standard deviation calculated based on the data of the distance values measured in the zone scanned with the laser beam LB.

Measuring the slopes of the stage 200 and the bending head 310 with the upper sensor 600 at operation S100 may be followed by determining at operation S200 whether the slopes of the stage and the bending head are each out of a predetermined tolerance range and correcting the slope at operation S210. Although it is preferable that the stage 200 and the bending head 310 are level without being sloped, i.e., in the state of having the slope of 0, the bending process may be carried out if the slope is in the tolerance range. The tolerance range of the slopes of the stage 200 and the bending head 310 may vary depending on the process target object 1 to be bent.

As described above, correcting the slopes of the stage 200 and the bending head 310 at operation S210 may be carried out in the case where the slopes of the stage 200 and the bending head 310 that have been derived previously are out of the tolerance range. Correcting the slope of the stage 200 may include adjusting the fastening degree (or fastening force) of each of the plurality of stage clamping members 230. Correcting the slope of the bending head 310 may also include, but is not limited to, adjusting the fastening degree (or fastening force) of each of the plurality of bending-clamping members 340. The upper surface of the slope-corrected stage 200 and bending head 310 may be substantially level.

However, in the case where the slopes of the stage 200 and the bending head 310 are in the tolerance range, measuring the height of the stage with the side sensor at operation S300 may be carried out as the next operation.

Figure 11:
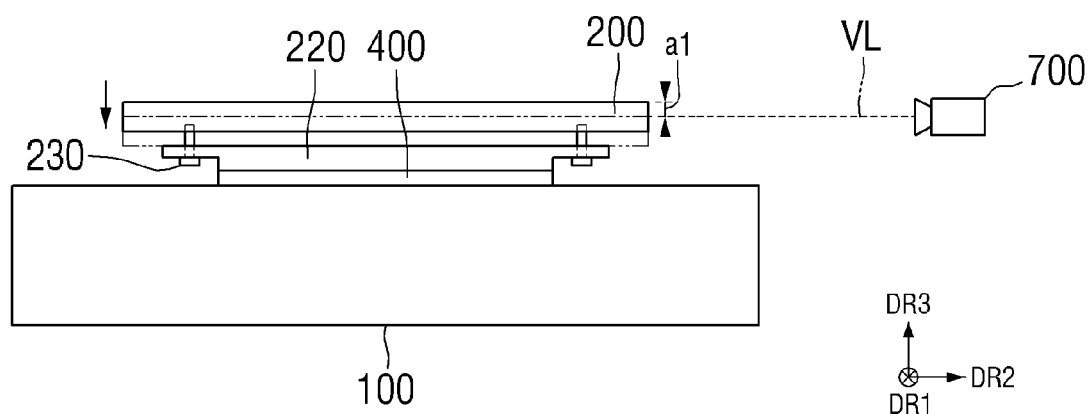
Figure 12:
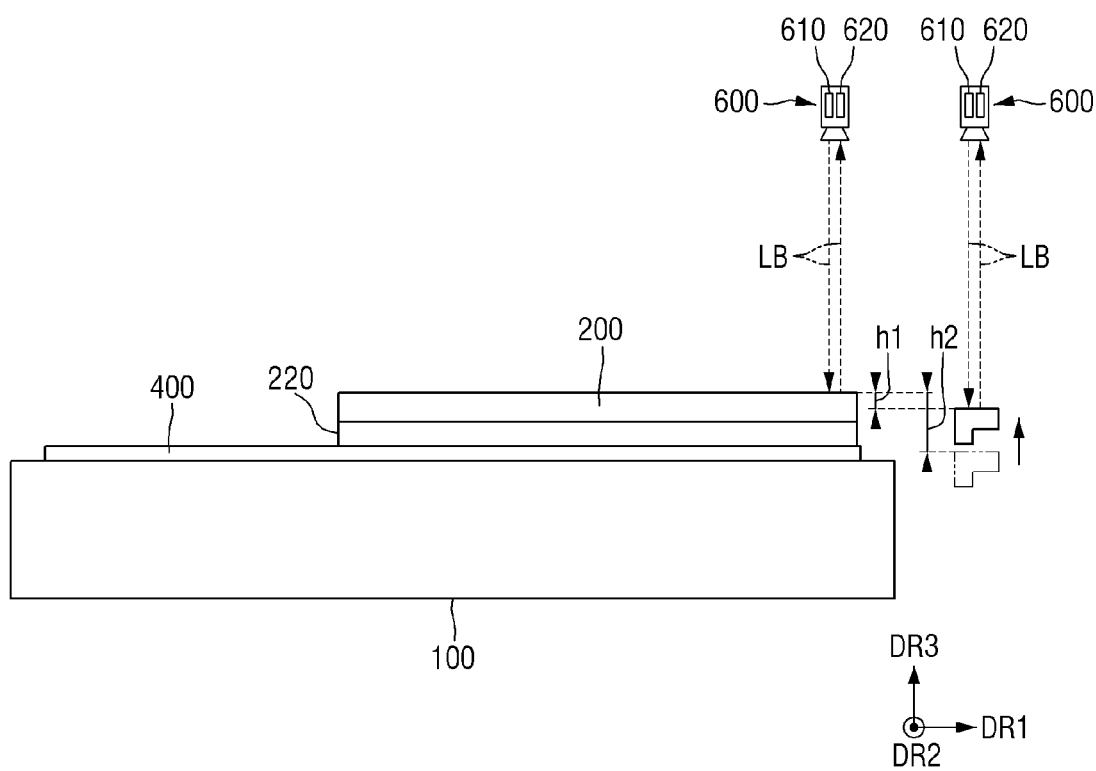

In reference to FIGS. 8 and 11, the side sensor 700 fixed in height at a side of the stage 200 may sense a change of the height of the upper surface of the stage 200. In an exemplary embodiment, if the height of the stage 200 is changed, it may be possible to measure a height difference a1 between the reference line VL and the upper surface of the stage 200.

Measuring the height of the stage 200 with the side sensor 700 at operation S300 may be followed by determining at operation S400 whether the height of the stage is out of tolerance range and correcting the height at operation S410. In an exemplary embodiment, the bending process may be carried out if the height of the stage 200 measured from the reference line VL is in the predetermined tolerance range. The tolerance range of the height of the stage 200 may vary depending on the process target object 1.

As described above, correcting the height of the stage 200 at operation S410 may be carried out in the case where the height of the stage 200 measured from the reference line VL is out of the tolerance range. Correcting the height of the stage 200 may be carried out in such a way that the controller 500 controls the stage drive member 220 to drive the stage 200 to move in the vertical direction. For example, in the case where the upper surface of the stage 200 is out of level with the reference line VL, the side sensor 700 may generate a signal to the controller 500 in order for the controller 500 to control the stage drive member 220 to drive the stage 200 to move the upper surface of the stage 200 as much as the height difference a1 in the vertical direction so as to be level with the reference line VL. Although the height of the stage 200 may be automatically measured and corrected under the control of the controller 500, the inventive concepts are not limited thereto.

However, in the case where the height of the stage 200 is in the tolerance range, measuring the height difference between the stage and the bending head with the upper sensor at operation S500 may be carried out.

In reference to FIGS. 8 to 12, it may be possible to measure the height difference between the upper surfaces of the stage 200 and the bending head 310 with the upper sensor 600. As described above, the upper sensor 600 may be a distance measurement sensor that is capable of measuring a distance from the upper sensor 600 to the upper surface of the stage 200 and a distance from the upper sensor 600 to the upper surface of the bending head 310, and the height difference between the upper surfaces of the stage 200 and the bending head 310 may be derived from the two distances.

As described above, correcting the height difference between the stage 200 and the bending head 310 at operation S610 may be carried out in the case where the previously measured height difference between the stage 200 and the bending head 310 is out of the tolerance range. Correcting the height difference between the stage 200 and the bending head 310 may be carried out in such a way that the controller 500 controls the vertical movement member 320 of the bending unit 300 to move the bending unit 300 in the vertical direction.

In an exemplary embodiment, the height difference between the upper surfaces of the stage 200 as the reference and the bending head 310 may be referred to as first height difference h1. If at least one of the stage 200 and the bending unit 300 changes in height, the height difference between the upper surfaces of the stage 200 and the bending head 310 may be changed to a second height difference h2. In this case, the upper sensor 600 may generate a signal to the controller 500 in order for the controller 500 to control the vertical movement member 320 of the bending unit 300 to move such that the height difference between the upper surfaces of the stage 200 and the bending head 310 is corrected to be the first height difference h1. Although measuring and correcting the height difference between the stage 200 and the bending head 310 may be automatically carried out under the control of the controller 500, the inventive concepts are not limited thereto.

However, in the case where the height difference between the stage 200 and the bending head 310 is in the tolerance range, arranging the process target object 1 on the stage 200 and bending the process target object 1 in the state of contacting the bending head 310 may be carried out as subsequent operations. The description of the process to bend the process target object 1 has been made with reference to FIGS. 3 to 7 and is omitted hereinafter.

According to an embodiment, the display device manufacturing method may be capable of identifying the degree of slope of each of the stage 200 and the bending unit 300. It may also be possible to measure the height of the stage 200 and the height of the bending unit 300 in relation to the height of the stage 200 and correct the height of the bending unit 300. This makes it possible for the process target object 1 to be accurately placed across the stage 200 and the bending unit 300 and stably bent by the bending unit 300, which leads to improvement of the reliability and display quality of the display device DD manufactured from the process target object 1.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An apparatus configured to manufacture a display device, comprising:
   a stage configured to place a process target object on an upper surface thereof;
   a bending head in contact with the process target object to bend the process target object;
   a distance measurement sensor installed above the stage to be movable in a horizontal direction;
   a cylinder configured to adjust a vertical position of the bending head; and
   a controller configured to control the position adjustment of the cylinder with respect to the bending head,
   wherein the distance measurement sensor measures a first distance between the distance measurement sensor and an upper surface of the bending head and a second distance between the distance measurement sensor and the upper surface of the stage, respectively, and transmits the measured distances to the controller, and
   the controller derives a third distance between the upper surface of the bending head and the upper surface of the stage based on the first distance and the second distance, and determines a position adjustment amount of the cylinder in a vertical direction based on the third distance.

2. The apparatus of claim 1, wherein the distance measurement sensor includes a light transmission member configured to emit a laser beam and a light reception member configured to receive the laser beam.

3. The apparatus of claim 2, wherein the distance measurement sensor calculates a distance by measuring a time taken for the laser beam emitted from the light transmission member to arrive at the light reception member.

4. The apparatus of claim 1, further comprising:
   a height measurement sensor disposed outside the stage,
   wherein the height measurement sensor measures a height difference between the height measurement sensor and the upper surface of the stage.

5. The apparatus of claim 4, wherein the height measurement sensor includes a camera module.

6. The apparatus of claim 1, further comprising:
   a first horizontal adjustment member configured to adjust horizontality of the bending head; and
   a second horizontal adjustment member configured to adjust horizontality of the stage.

7. The apparatus of claim 1, wherein the upper surface of the stage and the upper surface of the bending head are in parallel with each other.

8. The apparatus of claim 1, further comprising:
   a stage drive member to which the stage is fastened; and
   a guide member having a shape extending in one direction and guiding movement of the stage drive member.

9. The apparatus of claim 8, wherein the stage drive member includes a second cylinder configured to adjust a vertical position of the stage.

10. The apparatus of claim 1, wherein the bending head includes a first suction member.

11. The apparatus of claim 10, wherein the first suction member includes a plurality of suction holes configured to provide a negative pressure.

12. The apparatus of claim 11, wherein the stage includes a second suction member.

13. The apparatus of claim 12, wherein the process target object includes a first element and a second element partially contacting the first element, and
   the first element is sucked onto the first suction member, and the second element is sucked onto the second suction member.

* * * * *